(12) United States Patent
Cho et al.

(10) Patent No.: US 7,911,408 B2
(45) Date of Patent: Mar. 22, 2011

(54) MANAGEMENT SYSTEM OF MONITOR

(75) Inventors: Cheon-yong Cho, Suwon-si (KR); Joung-hum Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1479 days.

(21) Appl. No.: 11/143,437

(22) Filed: Jun. 3, 2005

(65) Prior Publication Data
US 2006/0026274 A1 Feb. 2, 2006

(30) Foreign Application Priority Data
Jun. 29, 2004 (KR) .................. 10-2004-0049392

(51) Int. Cl.
*G09G 5/00* (2006.01)
(52) U.S. Cl. ......................... 345/2.1; 709/223
(58) Field of Classification Search .................. 345/2.1, 345/2.2, 2.3; 715/771; 709/223, 224
See application file for complete search history.

(56) References Cited

U.S. PATENT DOCUMENTS

| | | | |
|---|---|---|---|
| 6,195,723 B1 | 2/2001 | Neal et al. | |
| 6,263,440 B1 * | 7/2001 | Pruett et al. | 726/35 |
| 6,342,890 B1 * | 1/2002 | Shetter | 345/467 |
| 6,380,949 B2 * | 4/2002 | Thomas et al. | 715/705 |
| 6,498,611 B1 * | 12/2002 | Beard et al. | 715/752 |
| 6,509,911 B1 | 1/2003 | Shimotono | |
| 6,526,516 B1 | 2/2003 | Ishikawa et al. | |
| 6,584,571 B1 | 6/2003 | Fung | |
| 6,615,360 B1 | 9/2003 | Amini et al. | |
| 6,639,613 B1 | 10/2003 | Nason et al. | |
| 6,694,428 B2 | 2/2004 | Lemke et al. | |
| 6,966,033 B1 * | 11/2005 | Gasser et al. | 715/738 |
| 7,266,597 B2 * | 9/2007 | Wiener | 709/223 |
| 7,316,016 B2 * | 1/2008 | DiFalco | 718/102 |
| 7,346,708 B2 * | 3/2008 | Minamisawa | 709/250 |
| 7,467,199 B2 * | 12/2008 | Tanaka et al. | 709/224 |
| 7,486,970 B2 * | 2/2009 | Kim et al. | 455/566 |
| 2003/0055946 A1 * | 3/2003 | Amemiya | 709/224 |
| 2003/0101261 A1 * | 5/2003 | Ikeda et al. | 709/224 |
| 2003/0200308 A1 * | 10/2003 | Tameda et al. | 709/224 |

(Continued)

FOREIGN PATENT DOCUMENTS
JP 2001195341 7/2001
(Continued)

OTHER PUBLICATIONS

PCT Search Report issued on Sep. 7, 2005, for PCT/KR2005/001574.

(Continued)

*Primary Examiner* — Quan-Zhen Wang
*Assistant Examiner* — Tom V Sheng
(74) *Attorney, Agent, or Firm* — Stanzione & Kim, LLP

(57) ABSTRACT

A management system of a monitor including at least one first monitor, a first computer to supply a video signal to the at least one first monitor having a first controller to transmit monitor information about the at least one first monitor through a network, a second monitor, and a second computer having a database to store the monitor information received through the network, and a second controller to display a graphic user interface to display the monitor information stored in the database on the second monitor. With this configuration, the monitor management system checks and/or manages a plurality of monitors connected to a plurality of computers connected to each other through a network from another computer.

44 Claims, 7 Drawing Sheets

U.S. PATENT DOCUMENTS

| | | | |
|---|---|---|---|
| 2004/0015730 A1* | 1/2004 | Arai et al. | 713/201 |
| 2004/0194066 A1* | 9/2004 | Frey et al. | 717/127 |
| 2005/0015480 A1* | 1/2005 | Foran | 709/224 |
| 2005/0060397 A1* | 3/2005 | Barthram et al. | 709/223 |
| 2005/0132036 A1 | 6/2005 | Jang et al. | |
| 2005/0198245 A1* | 9/2005 | Burgess et al. | 709/223 |
| 2005/0216585 A1* | 9/2005 | Todorova et al. | 709/224 |

FOREIGN PATENT DOCUMENTS

| | | |
|---|---|---|
| JP | 2002-26932 | 1/2002 |
| KR | 1998-42366 | 8/1998 |
| KR | 20-254139 | 1/2001 |
| KR | 2003-0026134 | 3/2003 |
| KR | 20050058899 | 6/2005 |

OTHER PUBLICATIONS

Korean Office Action issued Aug. 9, 2010 in KR Application No. 2004-0049392.

Notice of Allowance issued Jan. 10, 2011 in KR Application No. 2004-0049392.

* cited by examiner

MANAGEMENT SYSTEM OF MONITOR

CROSS-REFERENCE TO RELATED APPLICATIONS

This application claims the benefit of Korean Patent Application No. 2004-49392, filed on Jun. 29, 2004, in the Korean Intellectual Property Office, the disclosure of which is incorporated herein by reference.

BACKGROUND OF THE INVENTION

1. Field of the Invention

The present general inventive concept relates to a monitor management system, and more particularly to a monitor management system to check and manage a plurality of monitors connected to a plurality of computers connected to each other through a network from another computer.

2. Description of the Related Art

According to a recent development in monitor and network communication, a network environment has changed from a central hosting based on a main frame to a client/sever network environment, and this change has established a global network system connecting local based servers around the world or the nation.

Accordingly, companies and organizations connect client computers to each other through a server computer, and connect the server computer to an external network, such as the Internet. Herein, each of the client computers connected to the server computer has its own IP address so that the server computer can manage each of the client computers, and various management systems have been developed to efficiently control the client computers.

However, in such a conventional network system, although the server computer simply controls each of the client computers connected thereto, there is no management system to manage monitors connected to the respective client computers.

Therefore, the server computer cannot receive any information related to each of the monitors, for example, a type and a specification of the monitor, etc., and the server cannot check whether the monitor is actually connected to the computer. For example, a manager in charge of parts or a server administrator in a company has to go and see which monitor is connected to which computer and if there is a monitor missing or damaged that needs to be replaced.

Further, the monitor might get stolen as the monitor in a CRT (Cathode Ray Tube) type is replaced with an LCD (Liquid Crystal Display) monitor, and therefore a proper management system for the monitor is needed.

SUMMARY OF THE INVENTION

Accordingly, the present general inventive concept provides a monitor management system capable of checking and/or managing a plurality of monitors connected to a plurality of computers, which are connected to each other through a network from another computer.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a management system of a monitor comprising at least one first monitor, a first computer to supply a video signal to the first monitor and comprising a first controller to transmit monitor information about the first monitor through a network, a second monitor, and a second computer comprising a database to store the monitor information received through the network, and a second controller to display a graphic user interface displaying the monitor information stored in the database on the second monitor.

The monitor information may comprise at least one of EDID (Extended Display Identification) data provided to the first controller from the first monitor, user information about a user of the first monitor, and computer information about the first computer.

The EDID data may comprise at least one of a serial number and a model number of the first monitor.

The user information may comprise at least one of a user identification associated with the user of the first monitor, a user name associated with the user of the first monitor, and an installation place of the first monitor.

The computer information may comprise at least one of a computer name associated with the first computer, an IP address of the first computer, an operating system of the first computer, communicability of a data communication line between the first computer and the first monitor, an activating state of the first controller, and a used-hour of the first monitor.

The first controller may display a user interface to input at least one of the user information and the IP address information of the first computer on the first monitor, and may transmit the user information and/or the IP address information of the first computer input through the user interface through the network.

The graphic user interface may comprise a list table to display the monitor information stored in the database.

The list table may comprise a first field to display the EDID data.

The list table may further comprise a second field to display at least one of the user information and the computer information.

If one of the first monitors displayed on the list table is selected, the second controller correspondingly can display an information block to display the monitor information about the selected first monitor on the graphic user interface.

The information block may comprise a system block to display the EDID data and the computer information, and a user block to display the user information.

The graphic user interface may further comprise a system tab and a user tab respectively corresponding to the system block and the user block, and the second controller may display one of a selected block among the system block and the user block on the graphic user interface according to a selection of the system tab and the user tab.

The second controller can transmit a control signal to the first computer through the network, and the first controller can control an operational state of the first monitor on the basis of the control signal received through the network.

The graphic user interface may further comprise a check box to select at least one of the first monitors displayed on the list table, and a control signal check box comprising one of a power button to turn on/off power of the first monitor, an OSD control button to restrict OSD functions supported by the first monitor and a displaying state control button to adjust the displaying state of an image displayed on the first monitor, and if one of these control buttons in the control signal check box is clicked, the second controller may transmit the control signal corresponding to the clicked control button to the first computer associated to the first monitor selected through the check box through the network.

The displaying state control button may comprise at least one of an auto adjustment control button to allow the first monitor to perform an auto adjustment function, and a screen control button to reset a size and/or position of a screen displayed on the first monitor.

The graphic user interface may further comprise an input label box to input given input information about the first monitor.

The graphic user interface may further comprise a file save button, and the second controller may save the monitor information stored in the database as a text file if the file save button is selected.

The second computer may further comprise a text viewer program to view the text file, and the graphic user interface may further comprise a file open button, and the second controller may open the text file using the text viewer program if the file open button is selected.

The graphic user interface may further comprise a delete button, and the second controller may delete the monitor information about the first monitor selected through the check box from the database if the delete button is selected.

BRIEF DESCRIPTION OF THE DRAWINGS

The present general inventive concept will be better understood and its various objects and advantages will be more fully appreciated from the following description taken in conjunction with the accompanying drawings, in which.

DETAILED DESCRIPTION OF THE PREFERRED EMBODIMENTS

Figure 1:
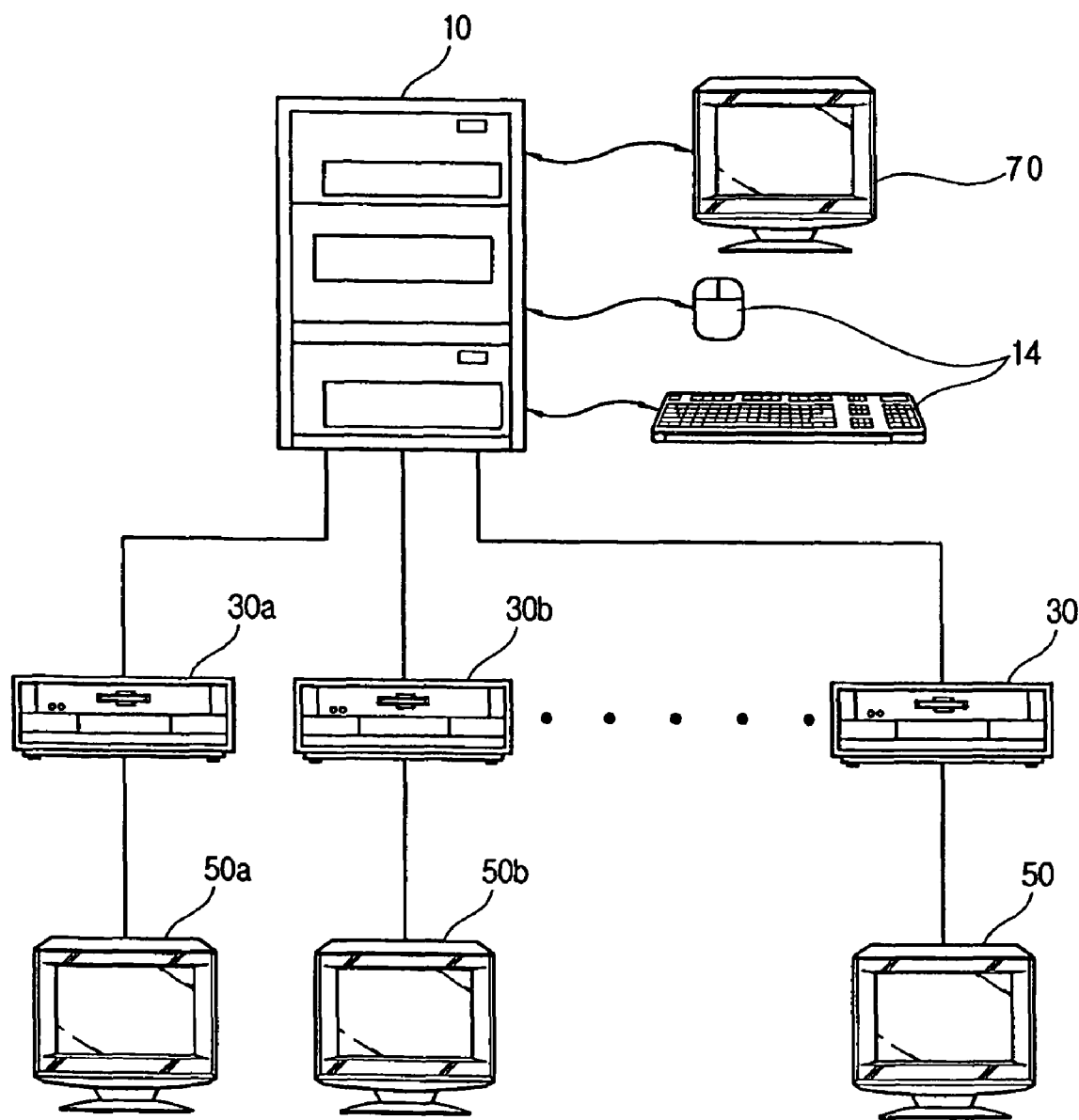
FIG. 1 illustrates a configuration of a monitor management system.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

As shown in FIG. 1, a monitor managing system according to an embodiment of the present general inventive concept may comprise a plurality of computers 10, 30, 30a and 30b connected to each other through a network, and a plurality of monitors 70, 50, 50a and 50b respectively connected to the plurality of computers 10, 30, 30a and 30b. Hereinafter, the reference numerals 10 and 70 respectively refer to a server computer 10 and a server monitor 70 connected to the server computer 10. The server computer 10 may comprise a user input part 14 to output a key signal corresponding to an operation of a user of the server computer 10.

Each of the plurality of computers 30, 30a and 30b may comprise a first controller 31 (refer to FIG. 2) to transmit information relevant to the respective monitors 50, 50a and 50b connected thereto through the network. Further, one of the plurality of computers 10, 30, 30a and 30b may comprise a database 12 (refer to FIG. 3) to store the information related to the monitors 50, 50a, and 50b transmitted through the network, and a second controller 11 (refer to FIG. 3) to provide a graphic user interface (GUI) 100a and 100b (refer to FIGS. 4, 5 and 7) to visually display the information related to the monitors 50, 50a, and 50b stored in the database 12.

Hereinafter, it will be inferred that the server computer 10 exemplarily comprises the database 12 and the second controller 11. Further, a computer comprising the database 12 and the second controller 11 is exemplarily referred to as a second computer 10, and a monitor connected to the second computer 10 is referred to as a second monitor 70. In addition, a computer with the reference numeral 30 among the computers 30, 30a and 30b comprising the first controller 31 is referred to as a first computer 30, and a monitor connected thereto is referred to as a first monitor 50.

Figure 2:
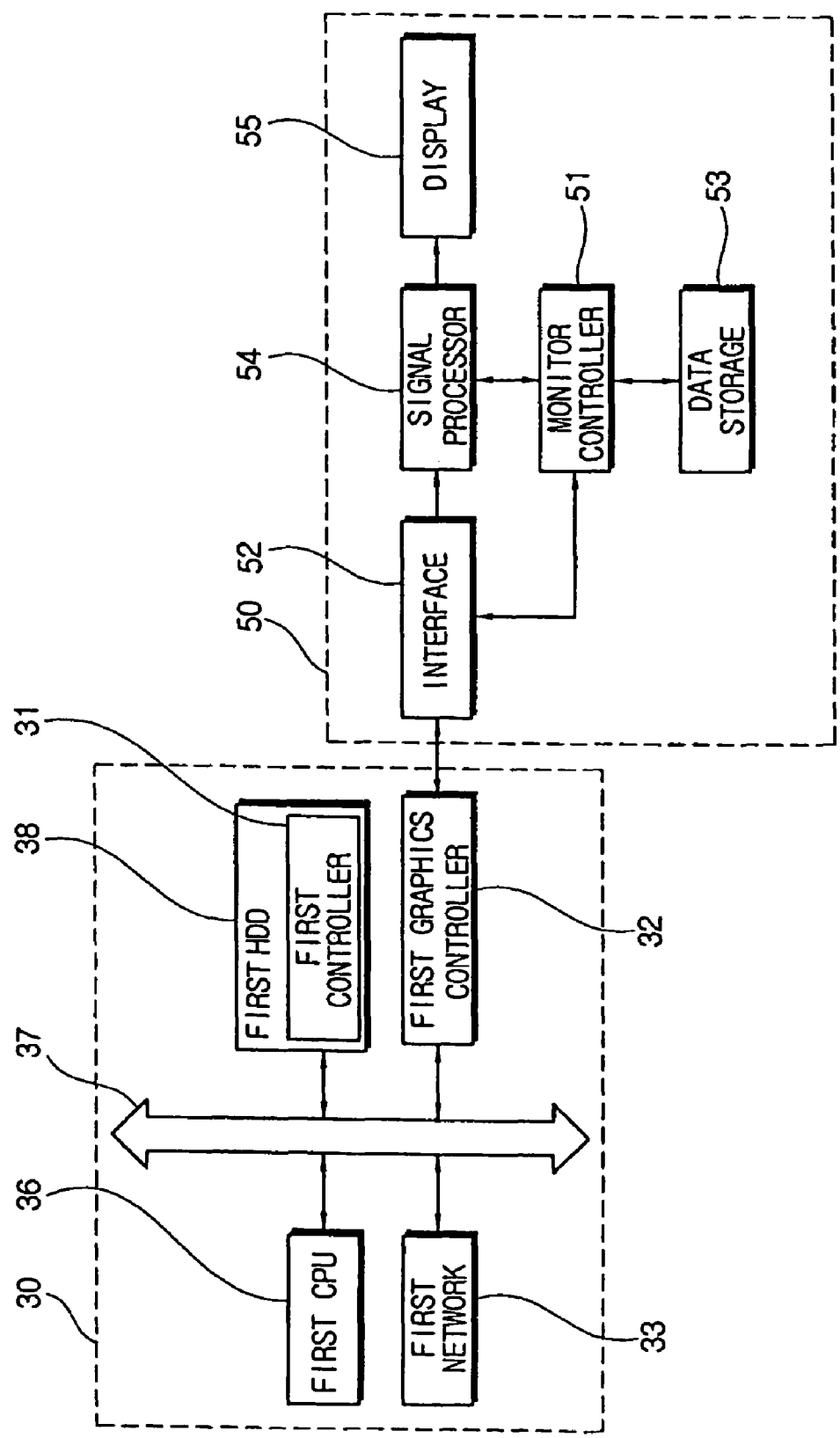
FIG. 2 illustrates a control block diagram of a first computer and a first monitor.

FIG. 2 illustrates a control block diagram of the first computer 30 and the first monitor 50.

The first monitor 50 may comprise a display 55 to display an image thereon, an interface 52 to receive a video signal output from the first computer 30, a signal processor 54 to convert the video signal input from the interface 52 into a displayable video signal to be displayed on the display 55, a data storage 53, and a monitor controller 51 to control the display 55, the interface 52, the signal processor 54 and the data storage 53.

The interface 52 can receive the video signal output from a first graphics controller 32 of the first computer 30. The video signal transmitted through the interface 52 may comprise an RGB (Red, Green and Blue) signal and H/V (Horizontal/Vertical) synchronous signals. The interface 52 may comprise various types of connectors connectable to the first graphics controller 32 of the first computer 30, and the connectors may comprise a D-sub connector, a DVI (Digital Visual Interface) connector, and the like.

The interface 52 can interactively communicate with the first computer 30. Thus, the first computer 30 is capable of transmitting data as well as the video signal to the first monitor 50, for example various signals to the monitor controller 51 through the interactive interface 52, and the first monitor 50 is also capable of transmitting data to the first computer 30 through the interactive interface 52. The interface 52 can support interactive communication with the first computer 30 by applying a DDC (Display Data Channel) protocol thereto, or another interface capable of interactively transmitting data such as a USB (Universal Serial Bus) interface may also be adopted. The DDC protocol is a VESA (Video Electronics Standard Association) standard supporting an automatic configuration, so called a "Plug-and play" on the first monitor 50 to specify a signal line and a process in communication between the first graphics controller 32 of the first computer 30 and the monitor controller 51 of the first monitor 50.

The monitor controller 51 controls the signal processor 54 and the display 55 to adjust a displaying state of the image on the basis of predetermined parameters. Herein, the predetermined parameters can be stored in a non-volatile memory, such as an EEPROM (Electrical Erasable Programmable Read Only Memory) (not shown). In addition, the monitor controller 51 can perform a control operation corresponding to a control signal from the first computer 30 (to be described in detail, hereinafter).

The data storage 53 may store EDID (Extended Display Identification) data therein, and the monitor controller 51 can output the EDID data stored in the data storage 53 to the first computer 30 through the interface 52, for example, the DDC communication line.

The first computer 30 may comprise a first CPU (Central Processing Unit) 36, the first graphics controller 32 to output the video signal to the first monitor 50 and to process a signal output from the first monitor 50, a first HDD (Hard Disk Drive) 38 to store an operating system (OS) and a plurality of applications run from the OS, a first network 33 to transmit/receive data to/from the second computer 10, and a first system bus 37 to connect the CPU 36, the first graphics controller 32, the first HDD 38 and the first network to each other.

The first graphics controllers 32 can support the DDC protocol to interactively communicate with the first monitor 50 corresponding to the interface 52 of the first monitor 50. If the interface 52 of the first monitor 50 supports the USB interface, the first graphics controller 32 may comprise a separate USB interface (not shown) corresponding to the USB interface of the first monitor 50.

The first controller 31 may be provided in the first HPD 38 and can control the monitor controller 51 to adjust the displaying state of the image displayed on the display 55. The first controller 31 may display a predetermined user interface to adjust the displaying state of the image of the first monitor 50. Herein, if a user sets the predetermined parameters through the user interface, the first controller 31 can transmit a control signal corresponding to the predetermined parameters set by the user through the user interface to the first monitor 50 through the first graphics controller 32. In this case, the monitor controller 51 of the first monitor 50 can reset the predetermined parameters to adjust the displaying state of the image displayed on the display 55 on the basis of the transmitted control signal and can store the reset parameters in the EEPROM, and adjust the displaying state of the image displayed on the display 55 based on the reset parameters.

The first controller 31 can transmit the information related to the first monitor 50 to the second computer 10 through the first network 33. Herein, the information related to the monitor may comprise at least one of the EDID data received from the first monitor 50, user information of the user of the first monitor 50 (or the user of the first computer 30) and computer information related to the first computer 30.

The EDID data may include various information of the first monitor 50 on the basis of the VESA standard. Herein, the EDID data may comprise a serial number and a model number of the first monitor 50 given by a manufacturer thereof.

The user information may comprise at least one of a user identification (ID) assigned to the user using the first monitor 50, a user name assigned to the user using the first monitor 50 and an installation place of the first monitor 50. If the management system of the monitor is applied to a company, the information about the installation place of the first monitor 50 may comprise a department name using the first monitor 50 and/or a building name in which the first monitor 50 is installed.

The computer information about the first computer 30 may comprise at least one of a computer name thereof, an IP (Internet Protocol) address thereof, an operating system thereof, a data communication line between the first computer 30 and the first monitor 50 (for example, communication availability of the DDC communication lines), an activating state of the first controller 31 and a used-hour of the first monitor 50.

In a case in which the first controller 31 does not respond to a request for the monitor information transmission from the second computer 10, for example, if the first controller 31 is an application program and the user terminated the program so that the first controller 31 cannot respond to the request, the second controller 11 of the second computer 10 can determine that the first controller 31 is not activated.

Figure 6:
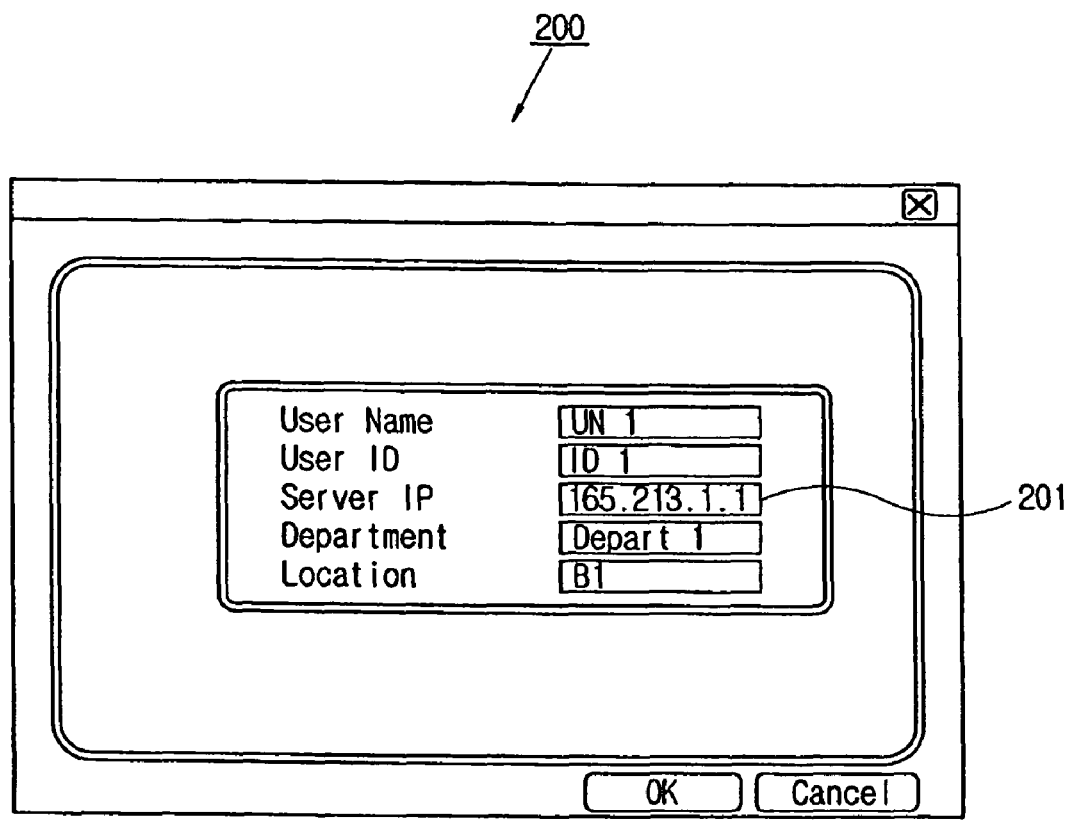
FIG. 6 illustrates a user interface.

Meanwhile, the first controller 31 can provide a user input interface 200 to input the user information, as shown in FIG. 6. Herein, the first controller 31 can display the user input interface 200 on the first monitor 50, and can transmit the user information input therefrom to the first computer 30 through the interface 52.

The user input interface 200 may further comprise an IP address input label 201 to enter the IP address of the first computer 30 thereon. Thus, the user of the first computer 30 can enter the IP address of the first computer 30 on the user input interface 200, to thereby provide the IP address information of the first computer 30 to the second computer 10. Therefore, even if the second computer 10 is not a server computer, it can have the IP address information of the first computer 30.

The first controller 31 can receive a given control signal from the second computer 10 through the first network 33, and then can transmit another control signal corresponding to the received control signal to the first monitor 50 through the first graphics controller 32. In this case, the monitor controller 51 of the first monitor 50 can control an operating state of the first monitor 50 on the basis of the control signal input from the first computer 30. The control signal transmitted to the first computer 30 from the second computer 10 will be described below.

The first controller 31 may be an application program run on the OS of the first computer 30, and installed in the first HDD 38 and stored therein.

Figure 3:
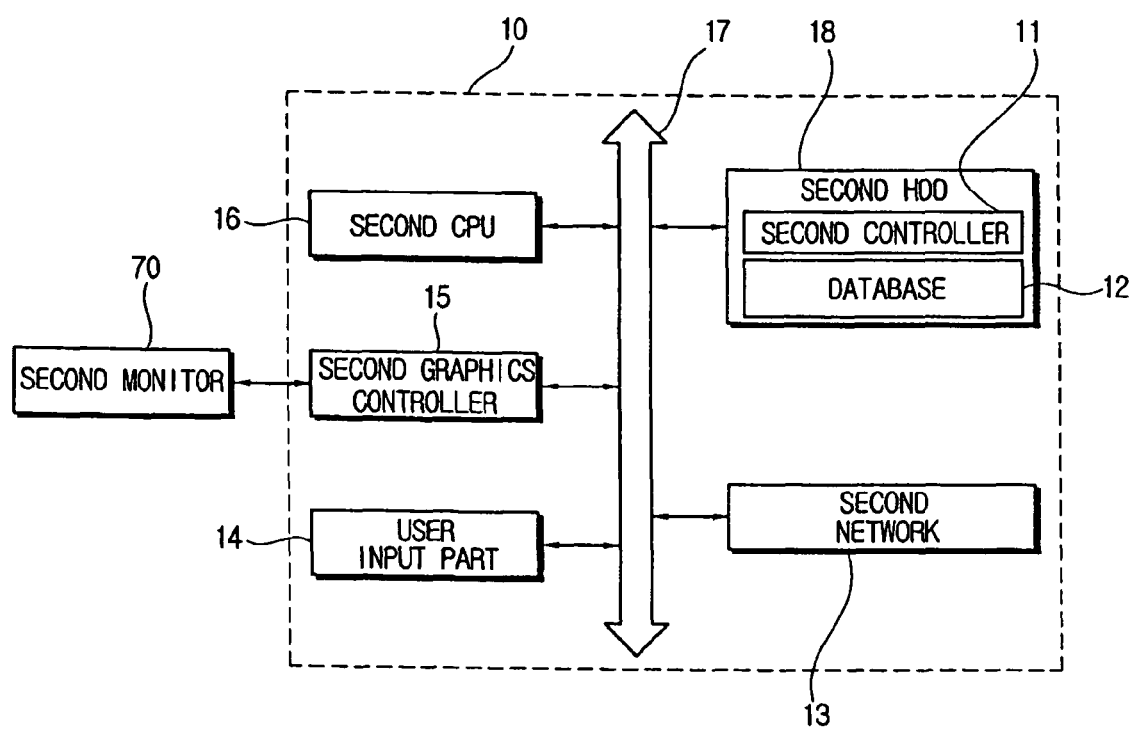
FIG. 3 is a control block diagram of a second computer and a second monitor.

FIG. 3 illustrates a control block diagram of the second computer 10 and the second monitor 70.

The second computer 10 can communicate with the first computer 30 through a network, such as a LAN (Local Area Network). In a case in which the second computer 10 is a server computer as illustrated in FIG. 1, the second computer 10 can broadcast and/or manage data communication between each of the other first computers 30, 30a and 30b, or between an external network such as the Internet and each of the other computers 30, 30a and 30b.

The second computer 10 may comprise a second CPU 16, a second HDD 18 to store an OS and a plurality of application programs run from the OS, a second network 13 to handle the data communication with the first computer 30, a second graphics controller 15 to transmit a video signal to the second monitor 70, the user input part 14 to output a key signal corresponding to an operation of a user of the second computer 10 (hereinafter, referred to as an "administrator"), and a second system bus to connect the foregoing elements to each other.

Further, the second computer 10 may comprise the database 12 to store the monitor information transmitted through the second network 13 from the first computer 30, and the second controller 11 to display a graphic user interface (GUI) 100a and 100b (see FIGS. 4, 5 and 7) to display the monitor information stored in the database 12 on the second monitor 70. The second controller 11 may be provided as an application program run from the OS of the second computer 10, and if so, the application program can be installed in the second HDD 18. Herein, the second controller 11 can activate the GUI 100a and 100b and display the GUI 100a and 100b on the second monitor 70 if the operation of the second controller 11 is selected through the user input part 14.

The second controller 11 can detect the monitor information transmitted through the second network 13, and can store the detected monitor information in the database 12. In this case, the second controller 11 may request the first computer 30 to transmit the monitor information at a regular interval, or may request the first computer 30 to transmit the monitor information corresponding to the administrator's request input through the user input part 14. Further, the first controller 31 of the first computer 30 may transmit the monitor information through the network at a regular interval.

The second monitor 70 is connected to the second computer 10, and displays an image using a video signal transmitted from the second computer 10. A configuration of the second monitor 70 may correspond to that of the first monitor 50 to display the video signal as the image. Further, like the first monitor 50, the second monitor 70 may communicate with the second computer 10 through the DDC communication line, and thus the second controller 11 of the second computer 10 may transmit a control signal to the second monitor 70 through the DDC communication line to control the displaying state of the image displayed thereon.

Figure 4:
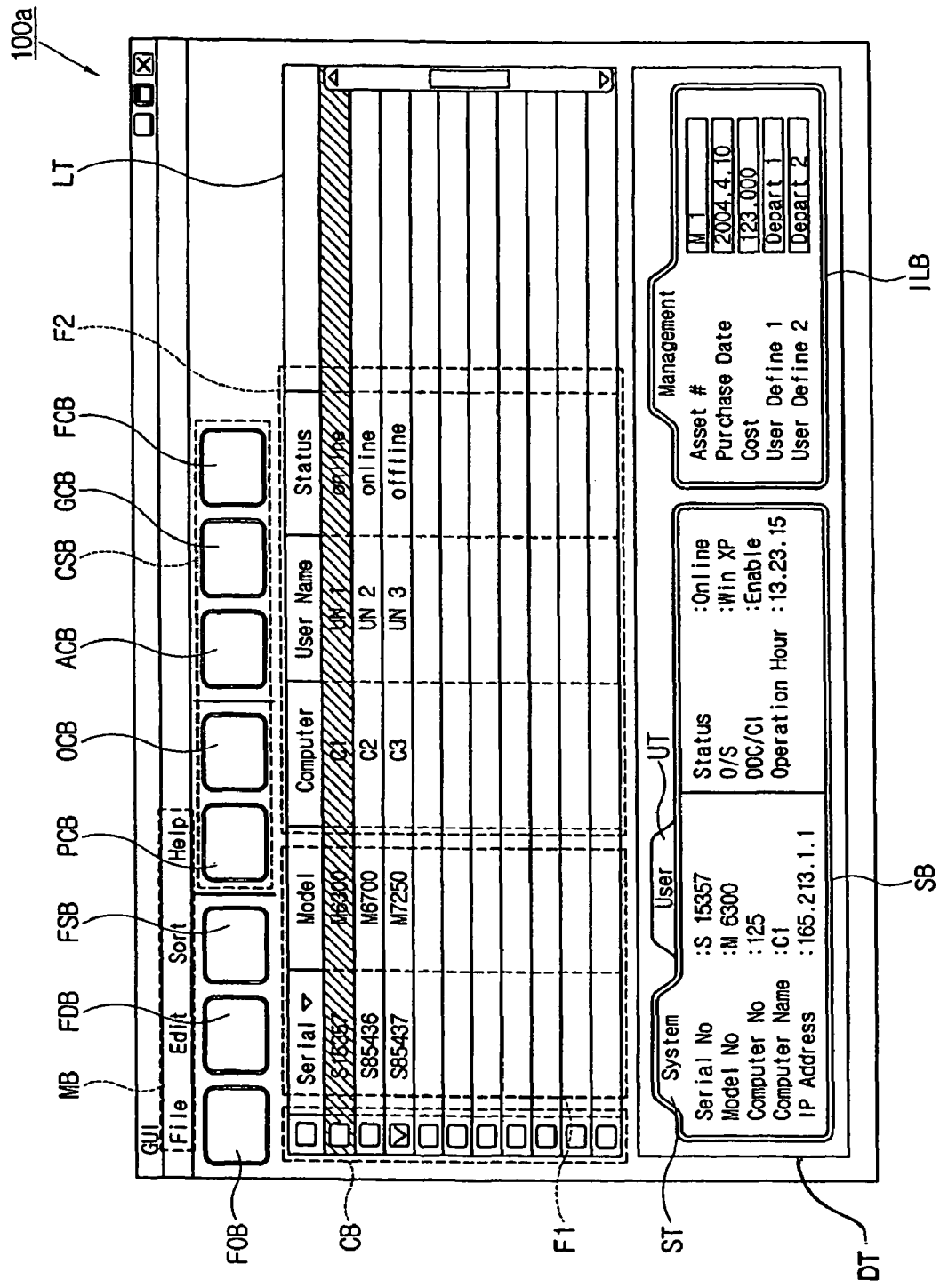
FIGS. 4, 5 and 7 illustrate a graphic user interface.
Figure 5:
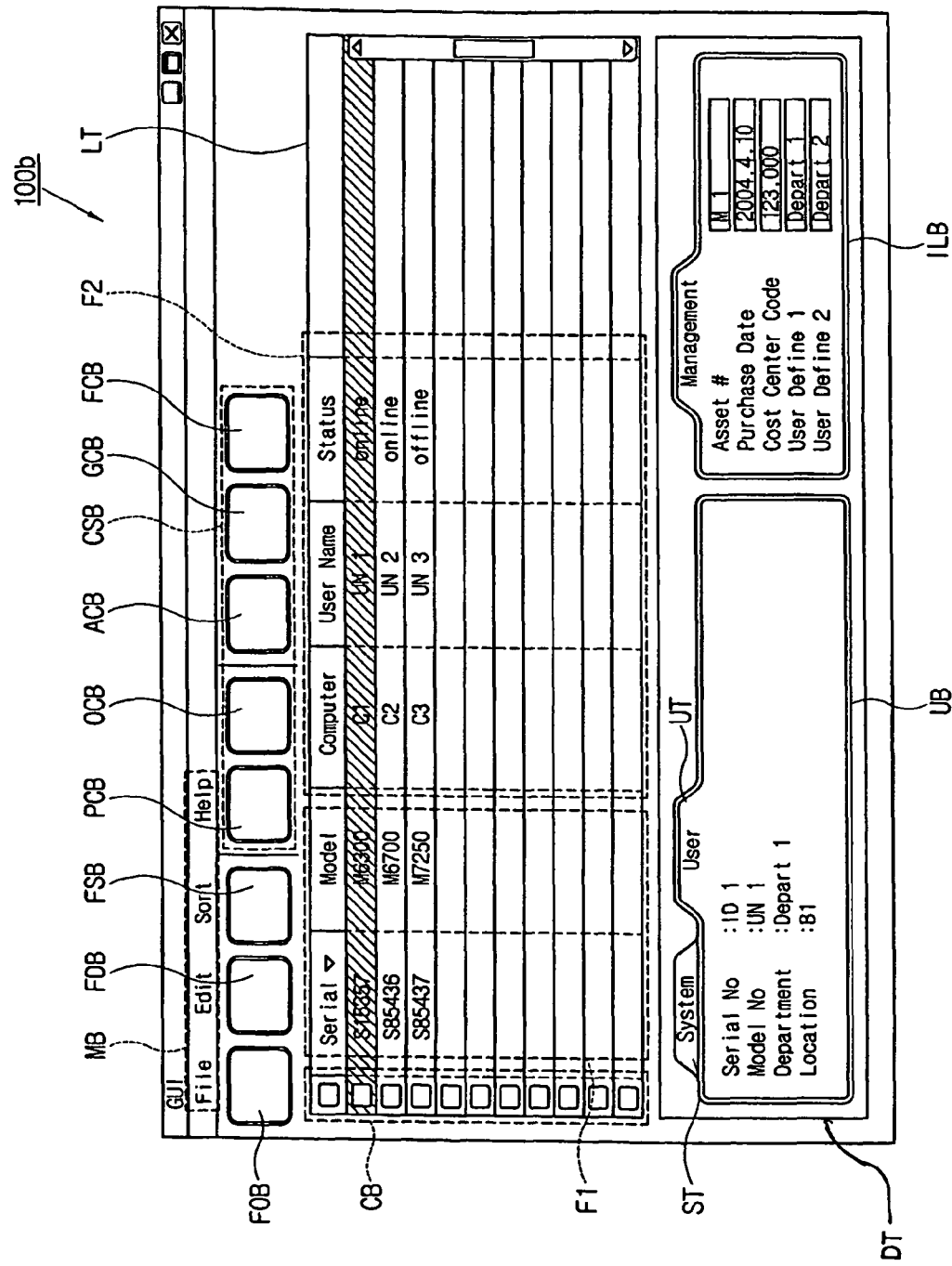

FIGS. 4 and 5 illustrate the GUI 100a and 100b. The GUI 100a and 100b may comprise a list table LT to display monitor information stored in the database 12.

The list table LT may comprise a first field F1 to display the EDID data of the monitor information. The first field F1 may include two fields, a serial number field to display the serial number of the first monitor 50, and a model name field to display a model name of the first monitor 50.

Further, the list table LT may comprise a second field F2 to display the user information and/or the computer information. The second field F2 may include a computer name field to display the computer name and a first controller driving state field to display a driving state of the first controller 31. In addition, the second field F2 may comprise a user name field to display a user name.

The GUI 100a and 100b may further comprise a display table DT. The display table DT may include a system block SB to display the EDID data and the computer information, and a user block UB to display the user information.

If the administrator selects one of the first monitors 50 displayed on the list table LT through the user input part 14, information about the selected first monitor 50 can be displayed on the display table DT. Thus, the administrator may check detailed information about the selected first monitor 50 through the display table DT.

In addition, the GUI 100a and 100b may comprise a system tab ST and a user tab UT corresponding to the system block SB and the user block UB. Herein, if the administrator selects one of the system tab ST and the user tab UT through the user input part 14, the second controller 11 can control the GUI 100a and 100b to display one of the system block SB and the user block UB corresponding to the selected tab. FIG. 4 illustrates the GUI 100a displaying the system block SB corresponding to the selected system tab ST FIG. 5 illustrates the GUI 100b displaying the user block UB corresponding to the selected user tab UT Accordingly, the GUI 100a and 100b can provide plenty of information relevant to the first monitor 50 to the administrator by maximizing spatial efficiency thereof.

The second controller 11 may transmit a control signal to the first computer 30 through the second network 13 to control the operational state of the first monitor 50. In this case, the first controller 31 of the first computer 30 can transmit the control signal corresponding to the control signal transmitted from the second controller 11 of the second computer 10 to the first monitor 50 through the first graphics controller 32. Accordingly, the monitor controller 51 of the first monitor 50 adjusts the displaying state of the image displayed on the display 55 or performs other functions related thereto corresponding to the control signal transmitted through the interface 52.

The GUI 100a and 100b may further comprise a check box CB to select at least one of the first monitors 50 displayed in the list table LT. Further, the GUI 100a and 100b may comprise a control signal check box CSB provided with control buttons to output a control signal.

The administrator can select at least one of the first monitors 50 displayed in the list table LT through the check box CB, and can click one of the control buttons of the control signal check box CSB using the user input part 14. When the administrator clicks one of the control buttons of the control signal check box C58, the second controller 11 can transmit a control signal corresponding to the clicked control button to the first computer 30 associated to the first monitor 50 selected from the check box CB through the second network 13.

The control buttons may comprise a power control button PCB to turn on/off power of the first monitor 50. Thus, the administrator can turn on/off the power of the first monitor 50 controlled by the first computer 30 through the GUI 100a and 100b of the second computer 10.

In addition, the control buttons may comprise an OSD (On Screen Display) control button OCB to restrict OSD functions supported by the first monitor 50. Herein, if a control signal is transmitted to restrict the OSC function of the first monitor 50 through the first computer 30, the first monitor 50 does not correspondingly respond to OSD buttons (not shown) selected by the user.

In addition, the control buttons may comprise a displaying state control button to adjust the displaying state on the image displayed on the first monitor 50. The displaying state control button may exemplarily comprise an automatic control button ACB to allow the first monitor 50 to perform an auto adjustment function, and a graphic control button to reset a size and/or a position of a screen displayed on the first monitor 50 to a predetermined state. The displaying state control button may further comprise other buttons to adjust resolution, contrast, and white balance, etc., of the image, and a factory mode control button FCB to convert the displaying state of the image displayed on the first monitor 50 into a factory mode.

The GUI 100a and 100b may further comprise an input label box ILB to enter given input information about the first monitor 50 stored in the database 12. The input information can be information related to the first monitor 50, and can be input by the administrator of the second computer 10 to manage the first monitors 50, and the input label box ILB may exemplarily include labels for an asset number, a date of purchase, a cost, and users of each of the first monitors 50.

In addition, the GUI 100a and 100b may comprise a file save button FSB and a file open button FOB. Herein, if the administrator selects the file save button FSB, the second controller 11 can save the monitor information about each of the first monitors 50 stored in the database 12 as a given text file format. If the administrator selects the file open button FOB, the second controller 11 can open the text file using a text viewer program to provide the administrator with the monitor information. In this case, the administrator may print out the monitor information about each of the first monitor 50 using the text viewer program.

Further, the GUI 100a and 100b may comprise a file delete button FDB. If the administrator selects a to- be-deleted first monitor 50 through the check box CB and clicks the file delete button, then the second controller 11 can delete the monitor information about the first monitor 50 selected through the check box CB from the database 12.

The GUI 100a and 100b may further comprise a menu bar MB comprising a plurality of pull down menu buttons. The menu bar may exemplarily include a file menu button, an edit menu button, a sort menu button and a help menu button.

If each of the menu buttons is clicked, a corresponding pull down menu with a select bar (not shown) is displayed to perform the forgoing function of the second controller 11. For example, if the administrator selects the file menu button, the pull down menu thereof can display the following select bars: save, open, delete, print and exit. Herein, the save bar corresponds the file save button FSB, the open bar corresponds the file open button FOB, and the delete bar corresponds the file delete button FDB.

Further, if the administrator selects the edit menu button, the corresponding pull down menu may display select bars corresponding to the control buttons, such as the power control buttons PCB, the OSD control button OCB and the displaying state control button, etc., in the control signal check box CSB.

Figure 7:
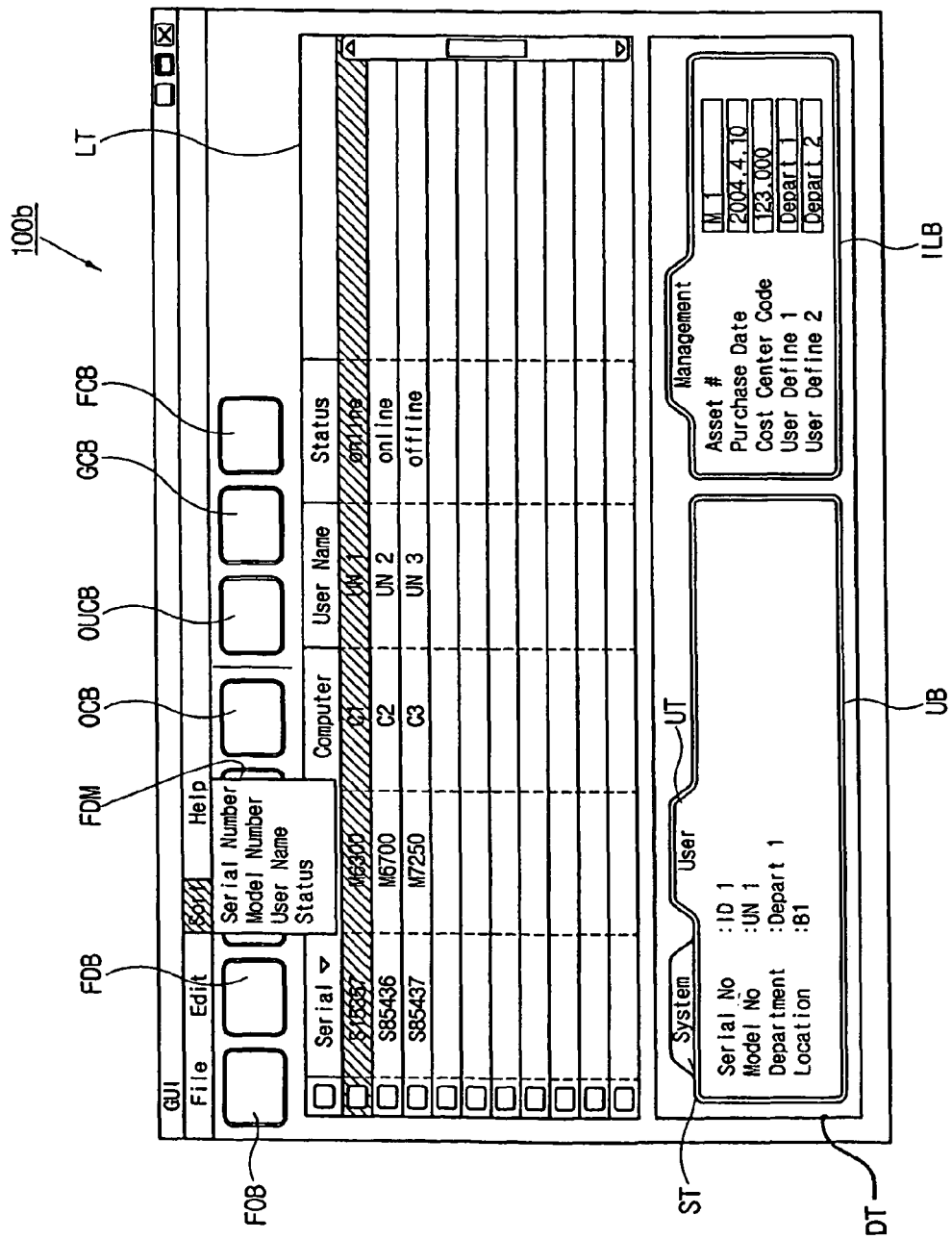

If the administrator selects the sort menu button, the corresponding pull down menu may display a serial number select bar, a model number select bar, a user name select bar and a status select bar, as shown in FIG. 7. Herein, if the administrator selects one of these select bars, the information about the first monitor 50 displayed in the list table LT may be rearranged corresponding to the selected bar.

If the help menu button is selected, the corresponding pull down menu may display select bars for a manual of the second controller 11 or information about the second controller 11.

The present general inventive concept may be provided at least one of the first monitors 50, at least one of the first computers 30 each comprising the first controller 31 to transmit the video signal and the monitor information about the first monitor 50 to the second computer 10 through the network, the second monitor 70 and the second computer 10 comprising the database 12 to store the monitor information received through the network and the second controller 11 to display the GUI 100a and 100b to display the monitor information stored in the database 12 on the second monitor 70, and thus the plurality of first monitors 50 connected to the plurality of first computers 30 communicating with each other through the network can be checked and/or managed from the second computer 10.

The second controller 11 can transmit the control signal to the first computer 30 through the network, and the first controller 31 can control the operational state of the first monitor 50 on the basis of the control signal received trough the network, and thus the second computer 10 managing the first monitor 50 can control the displaying state of the image displayed on the first monitor 50 or other functions thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A management system of at least one monitor comprising:
at least one first monitor;
at least one first computer to supply a video signal to the respective at least one first monitor and comprising a respective first controller to transmit monitor information about the respective at least one first monitor through a network;
a second monitor; and
a second computer comprising a database to store the monitor information received through the network, and a second controller to display a graphic user interface displaying the monitor information stored in the database on the second monitor in the form of a list and to control the operational state of the at least one first monitor using the received monitor information.

2. The management system according to claim 1, wherein the monitor information comprises at least one of EDID (Extended Display Identification) data provided to the at least one first controller from the at least one first monitor, user information associated with a user of the at least one first monitor, and computer information about the at least one first computer.

3. The management system according to claim 2, wherein the EDID data comprises at least one of a serial number and a model number of the at least one first monitor.

4. The management system according to claim 2, wherein the user information comprises at least one of a user identification set to the user of the at least one first monitor, a user name of the user of the at least one first monitor and an installation place of the at least one first monitor.

5. The management system according to claim 4, wherein the computer information comprises at least one of a computer name associated with the at least one first computer, an IP address of the at least one first computer, an operating system of the at least one first computer, communicability of a data communication line between the at least one first computer and the at least one first monitor, an activating state of the at least one first controller, and a used-hour of the at least one first monitor.

6. The management system according to claim 5, wherein the at least one first controller displays a user interface to input at least one of the user information and the IP address information of the at least one first computer on the at least one first monitor, and transmits the user information and/or the IP address information of the at least one first computer input through the user interface through the network.

7. The management system according to claim 2, wherein the graphic user interface comprises a list table to display the monitor information stored in the database.

8. The management system according to claim 7, wherein the list table comprises a first field to display the EDID data.

9. The management system according to claim 8, wherein the list table further comprises a second field to display at least one of the user information and the computer information.

10. The management system according to claim 8, wherein when the EDID data corresponding to the at least one first monitor displayed on the list table is selected, the second controller displays an information block to display the monitor information about the corresponding at least one first monitor on the graphic user interface.

11. The management system according to claim 10, wherein the information block comprises a system block to display the EDID data and the computer information, and a user block to display the user information.

12. The management system according to claim 11, wherein the graphic user interface further comprises a system tab and a user tab respectively corresponding to the system block and the user block, and
the second controller displays one of the system block and the user block on the graphic user interface according to a selection of the system tab and the user tab.

13. The management system according to claim 7, wherein the second controller transmits a control signal to the at least one first computer through the network, and the at least one first controller controls an operational state of the at least one first monitor on the basis of the control signal received through the network.

14. The management system according to claim 13, wherein the graphic user interface further comprises:

a check box to select at least one of the EDID data corresponding to the at least one first monitor displayed on the list table; and a control signal check box comprising at least one of a power button to turn on/off power of the at least one first monitor, an OSD (On Screen Display) control button to restrict OSD functions supported by the at least one first monitor and a displaying state control button to adjust a displaying state of an image displayed on the first monitor, and when one of the control buttons in the control signal check box is clicked, the second controller transmits a control signal corresponding to the clicked control button to the at least one first computer associated to the at least one first monitor selected through the check box through the network.

15. The management system according to claim 14, wherein the displaying state control button comprises at least one of an auto adjustment control button to allow the at least one first monitor to perform an auto adjustment function, and a screen control button to reset a size and/or a position of a screen displayed on the at least one first monitor.

16. The management system according to claim 14, wherein the user graphic interface further comprises a delete button, and the second controller deletes the monitor information about the at least one first monitor selected through the check box from the database when the delete button is selected.

17. The management system according to claim 7, wherein the graphic user interface further comprises an input label box to input given input information about the at least one first monitor therethrough.

18. The management system according to claim 7, wherein the graphic user interface further comprises a file save button, and the second controller saves the monitor information stored in the database as a text file when the file save button is selected.

19. The management system according to claim 18, wherein the second computer further comprises a text viewer program to view the text file, the graphic user interface further comprises a file open button, and the second controller opens the text file using the text viewer program if the file open button is selected.

20. The monitor management system according to claim 1, wherein the first and second controllers are an application program run on operating systems of the at least one first computer and the second computer, respectively.

21. A graphic user interface (GUI) used with a monitor management system having a plurality of monitors corresponding to a respective plurality of computers each having a controller connected to each other through a network, the GUI comprising:
a list table to display monitor information regarding each of the plurality of monitors;
a check box to select one of the plurality of monitors;
a display table to display system information and user information regarding the selected one of the plurality of monitors;
a control signal check box to select a control signal to control the selected one of the plurality of monitors; and
an input label box to enter additional information regarding the selected one of the plurality of monitors.

22. The GUI according to claim 21, wherein the list table comprises a plurality of fields to display different types of the monitor information.

23. The GUI according to claim 21, wherein the list table comprises:

a serial number field to display a serial number of each of the plurality of monitors;
a model name field to display a model name of each of the plurality of monitors;
a computer name field to display a name of each of the plurality of computers corresponding to each of the plurality of monitors;
a controller driving state field to display a driving state of the controller of each of the plurality of computers; and
a user name field to display a name of a user of each of the plurality of computers.

24. The GUI according to claim 21, wherein the display table comprises:
a system block to display the system information; and
a user block to display user information.

25. The GUI according to claim 24, further comprising:
a display tab to display to select the display block; and
a user tab to select the user block.

26. The GUI according to claim 21, wherein the control signal check box comprises
a power control button to turn on/off the power of the selected one of the plurality of monitors.

27. The GUI according to claim 21, wherein the control signal check box comprises an OSD (On Screen Display) control button to restrict OSD operations on the selected one of the plurality of monitors.

28. The GUI according to claim 21, wherein the control check box comprises a displaying state control button to adjust a displaying state of the selected one of the plurality of monitors.

29. The GUI according to claim 28, wherein the displaying state control button comprises an automatic control button to control the selected one of the plurality of monitors to perform an auto adjustment operation.

30. The GUI according to claim 28, wherein the displaying state control button comprises a graphic control button to reset a size and/or position of a display area of the selected one of the plurality of monitors.

31. The GUI according to claim 28, wherein the displaying state control button comprises a factory mode control button to convert the displaying state of the selected one of the plurality of monitors into a factory mode.

32. The GUI according to claim 21, further comprising:
a file save button to save the monitor information as a text file;
a file open button to open a file containing the monitor information; and
a file delete button to delete the monitor information.

33. The GUI according to claim 21, further comprising a menu bar.

34. The GUI according to claim 33, the menu bar comprises a sort menu button comprising:
a serial number select bar to select one of the plurality of monitors according to a serial number;
a model number select bar to select bar to select one of the plurality of monitors according to a model number;
a user name select bar to select one of the plurality of monitors according to a name of a user of a corresponding one of the plurality of computers; and
a status select bar to select one of the plurality of monitors according to a status of the controller of a corresponding one of the plurality of computers.

35. A method of managing monitors, comprising:
transmitting monitor information from at least one first computer through a network, the monitor information relating to a respective monitor;

receiving and storing the transmitted monitor information through the network at a second computer;

displaying a graphic user interface displaying the stored monitor information on a second monitor corresponding to the second computer in the form of a list, and controlling the operational state of the monitor of the at least one first computer using the transmitted monitor information.

36. The method according to claim 35, wherein the monitor information comprises at least one of EDID (Extended Display Identification) data provided to the at least one first computer from the respective monitor, user information associated with the respective monitor, and computer information about the at least one computer.

37. The method according to claim 35, wherein the graphic user interface comprises a list table to display the stored monitor information.

38. A method of managing monitors, comprising:
connecting a plurality of computers to each other through a network, each of the plurality of computers having a corresponding monitor connected thereto;
transmitting monitor information regarding each monitor through the network from the corresponding computer;
receiving the transmitted monitor information through the network;
displaying the received monitor information in a list; and
controlling each of the computers to manage the corresponding monito using the received monitor information displayed in the list.

39. The method according to claim 38, wherein the transmitted monitor information is received at a server computer.

40. The method according to claim 39, wherein the server computer stores the transmitted information in a database.

41. The method according to claim 38, wherein the monitor information comprises at least one of EDID (Extended Display Identification) data provided to each of the plurality of computers from the corresponding monitor, user information associated with a user of the corresponding monitor, and computer information about each of the plurality of computers.

42. The method according to claim 41, wherein the EDID data comprises at least one of a serial number and a model number of the corresponding monitor.

43. The method according to claim 41, wherein the user information comprises at least one of a user identification associated with the user of the corresponding monitor, a user name associated with the user of the corresponding monitor, and an installation place of the corresponding monitor.

44. The method according to claim 41, wherein the computer information comprises at least one of a computer name associated each of the plurality of computers, an IP address of each of the plurality of computers, an operating system of each of the plurality of computers, communicability of a data communication line between each of the plurality of computers and the corresponding monitor, an activating state of a controller of each of the plurality of computers, and a used-hour of the corresponding monitor.

* * * * *